US011262934B2

(12) United States Patent
Ainscow et al.

(10) Patent No.: US 11,262,934 B2
(45) Date of Patent: Mar. 1, 2022

(54) DELETION OF STORED DATA

(71) Applicant: INTERNATIONAL BUSINESS MACHINES CORPORATION, Armonk, NY (US)

(72) Inventors: Alexander Henry Ainscow, Winchester (GB); Richard Albert Welp, Manchester (GB)

(73) Assignee: International Business Machines Corporation, Armonk, NY (US)

(*) Notice: Subject to any disclaimer, the term of this patent is extended or adjusted under 35 U.S.C. 154(b) by 117 days.

(21) Appl. No.: 16/286,698

(22) Filed: Feb. 27, 2019

(65) Prior Publication Data
US 2020/0272353 A1 Aug. 27, 2020

(51) Int. Cl.
*G06F 3/06* (2006.01)
*G06F 11/14* (2006.01)

(52) U.S. Cl.
CPC ............ *G06F 3/0652* (2013.01); *G06F 3/065* (2013.01); *G06F 3/0619* (2013.01); *G06F 3/0659* (2013.01); *G06F 3/0673* (2013.01); *G06F 11/1458* (2013.01); *G06F 2201/84* (2013.01)

(58) Field of Classification Search
CPC ............ G06F 11/1451; G06F 2201/84; G06F 2201/80; G06F 16/2365; G06F 3/0652; G06F 3/0659; G06F 3/0673; G06F 3/0647; G06F 11/2092; G06F 11/1469; G06F 11/1448; G06F 11/1458; G06F 3/0604; G06F 3/0623
See application file for complete search history.

(56) References Cited

U.S. PATENT DOCUMENTS

| 9,678,968 B1 | 6/2017 | Taylor et al. |
| 2006/0248373 A1* | 11/2006 | Warman .............. H04L 67/1095 714/4.11 |
| 2010/0169595 A1* | 7/2010 | Bryant-Rich ....... G06F 11/1458 711/162 |

(Continued)

FOREIGN PATENT DOCUMENTS

| CN | 101963982 A | 7/2012 |
| CN | 103714137 B | 11/2017 |

OTHER PUBLICATIONS

Mell et al., "The NIST Definition of Cloud Computing", National Institute of Standards and Technology, Special Publication 800-145, Sep. 2011, pp. 1-7.

*Primary Examiner* — Reginald G Bragdon
*Assistant Examiner* — Thanh D Vo
(74) *Attorney, Agent, or Firm* — Teddi E. Maranzano

(57) ABSTRACT

A method of storing and deleting data maintains a record of backups of the stored data, the record defining an entry for each backup comprising details of the data that has been backed up and the location of the data that has been backed up. The record of backups of the stored data is updated with a new entry every time at least part of the stored data is stored at a new location different from the first location. Once an instruction is received to delete the stored data, the maintained record of backups of the stored data is accessed, and an instruction is transmitted for each respective entry in the record of backups, the instruction comprising an instruction to delete the stored data at the respective location for the respective entry.

9 Claims, 8 Drawing Sheets

(56) References Cited

U.S. PATENT DOCUMENTS

2014/0358935 A1* 12/2014 Prahlad ............... G06F 11/1466
707/741
2016/0055225 A1* 2/2016 Xu ..................... H04L 67/1097
707/624
2017/0351718 A1 12/2017 Faerber et al.

* cited by examiner

DELETION OF STORED DATA

BACKGROUND

The present invention relates to a method, system and computer program for storing data and deleting stored data.

SUMMARY

According to a first aspect of the present invention, there is provided a method comprising storing data in a first location, maintaining a record of backups of the stored data, the record defining an entry for each backup comprising details of the data that has been backed up and the location of the data that has been backed up, updating the record of backups of the stored data with a new entry every time at least part of the stored data is stored at a new location different from the first location, receiving an instruction to delete the stored data, accessing the maintained record of backups of the stored data, and transmitting an instruction for each respective entry in the record of backups, the instruction comprising an instruction to delete the stored data at the respective location for the respective entry.

According to a second aspect of the present invention, there is provided a storage controller comprising a processor arranged to store data in a first location, maintain a record of backups of the stored data, the record defining an entry for each backup comprising details of the data that has been backed up and the location of the data that has been backed up, update the record of backups of the stored data with a new entry every time at least part of the stored data is stored at a new location different from the first location, receive an instruction to delete the stored data, access the maintained record of backups of the stored data, and transmit an instruction for each respective entry in the record of backups, the instruction comprising an instruction to delete the stored data at the respective location for the respective entry.

According to a third aspect of the present invention, there is provided a computer program product for controlling a data processing system comprising a processor, the computer program product comprising a computer readable storage medium having program instructions embodied therewith, the program instructions executable by the processor to cause the processor to store data in a first location, maintain a record of backups of the stored data, the record defining an entry for each backup comprising details of the data that has been backed up and the location of the data that has been backed up, update the record of backups of the stored data with a new entry every time at least part of the stored data is stored at a new location different from the first location, receive an instruction to delete the stored data, access the maintained record of backups of the stored data, and transmit an instruction for each respective entry in the record of backups, the instruction comprising an instruction to delete the stored data at the respective location for the respective entry.

BRIEF DESCRIPTION OF THE DRAWINGS

Embodiments of the present invention will now be described, by way of example only, with reference to the following drawings, in which.

DETAILED DESCRIPTION

In storage devices and systems, the ability to create backups of data and ensure that there are multiple copies and reliable copies of data is an important characteristic of the devices and systems. Storage solutions have different methods for ensuring these backups are held either locally, remotely or in a separate set of technologies all together. For instance, IBM Storwize allows for remote copies, flash copies and the ability to store files in the cloud. IBM Spectrum Scale allows for filesystem/fileset backups, replication, transport management system backups (Spectrum Protect), and active file management relationships.

While these technologies are crucial for data retention, they have the drawback of not allowing users to easily and cleanly remove data from their systems without having to work through several different tools, or to understand where copies of their data have been stored. Currently, in many data storage systems, the ability to delete a file is simple, but when a file is replicated across many different retention policies, the ability to remove the file is more complex and can require a deep understanding of the backup and retention policies to remove the file(s). Additionally, with the introduction of the GDPR (general data protection rules) in the European Union, a storage system needs to be able to remove customer copies of data on demand, regardless of how the data was backed up.

Figure 1:
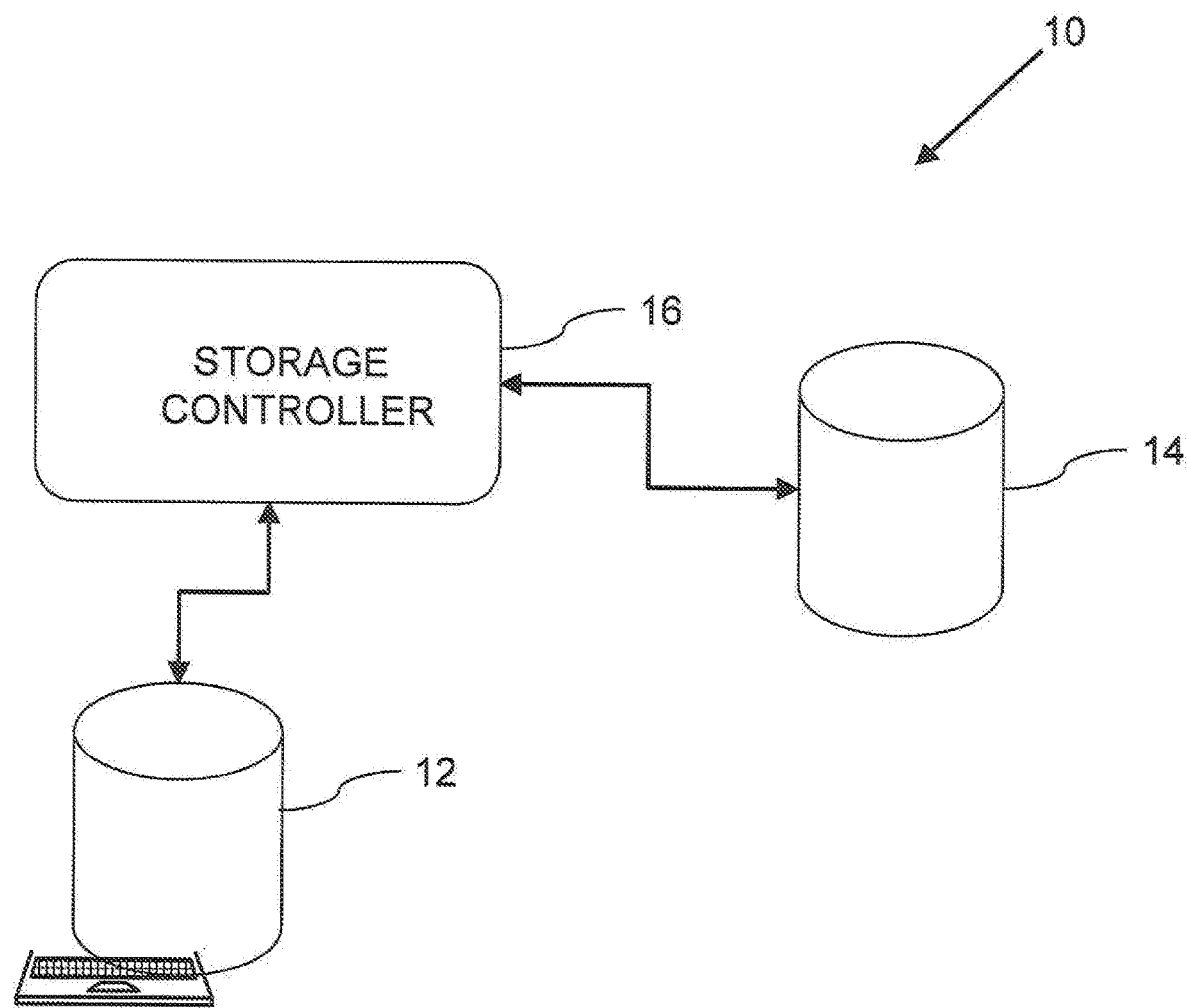
FIG. 1 is a schematic diagram of a storage system.

FIG. 1 shows an example of a storage system 10, which comprises a local storage device 12 and a remote storage device 14. A storage controller 16 is provided which has the principal responsibility of reading and writing data to and from the different storage components 12 and 14 and also backing up data that is stored in the local storage 12 to the remote storage 14. In order to prevent as far as possible any loss of data, some type of backup scheme has to be used at different storage locations to prevent data being loss. There are many different types of schemes that involve data redundancy and require data that is stored at one location to be copied to another location as a backup.

This system 10, through the storage controller 16, will understand and track how data is written to the storage device 12 as well as what data protection technologies the device 12 is configured to utilize. As the data is written or modified, the system 10 will understand and track information such as the creation date and last update etc. of the data. When data protection activities are applied to this data set, the system 10 will cross-reference these activities and understand where copies of the data are present so that when a delete request is presented, the data is removed to the extent that the user requested. The system 10 will also allow for a various levels of deletes requests.

One embodiment of the system can be embodied in an IBM Spectrum Scale environment. As files are written to a filesystem, the files are stored locally, then the storage controller 16 can create multiple snapshots, replicate asynchronously to a remote site, tier the data out to an object and the cloud or to tape. All of these methods can be tied to the single file and are intended to be a disaster recovery backup, and as such they allow for a file to be removed from a point in time, but the file will stay in the system 10 until the last backup has expired, then the backup is allowed to remove the file.

This system 10 provides a method for tracking the links between files, and in the case of a desire to remove a file, fileset, or filesystem etc., the data can be completely removed from the system 10 and all backups. This is key as when an administrator wants to recover space on a system, the administrator needs to remove any snapshot that has stored this set of data in order to reclaim the space from the system 10. This requires removing any backup of other files that may be associated with the data set in question. The system 10 tracks for all data (at whatever level this is considered, such as per block or per file) whenever a data backup is created and the location of the backup for the data in question is also stored.

The operation of the storage controller 16 is described at the file level, from the point of view of files being stored and backups of these files being taken. However the operation of the storage controller 16 can be at any desired level of data granularity, such as a data block, according to the data sizes used in the storage media that are being used at the different locations. The important principal that is used by the storage controller 16 is that whenever data is copied to another location in a backup operation (whether this backup occurs on a per file basis or some other basis) that there is maintained a record of the backups that have taken place.

Figure 2:
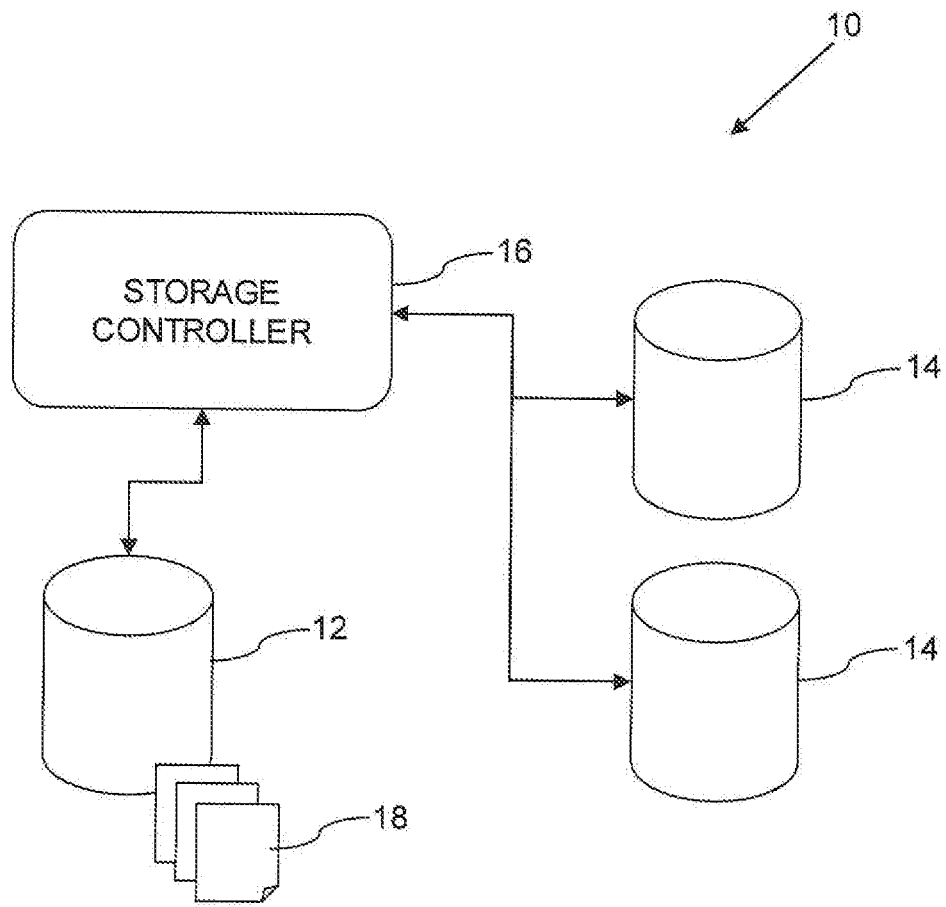
FIG. 2 is a schematic diagram of a second storage system.

FIG. 2 shows a second embodiment of a storage system 10, in which files 18 are first stored in a local storage device 12. Two different remote storages devices 14 are also present in the storage system 10 and the access to the files 18 present on the local storage device 12 is under the control of the storage controller 16. The storage controller 16 manages the access to the files 18, and reads and writes to and from the files 18, as requests arrive at the storage system 10 from external sources. The storage controller 16 is also responsible for protecting against data loss and to this end, the storage controller 16 periodically performs backups of data to one or more of the external storage devices 14.

Many different types of backup operations are possible, according to the configuration of the system 10 and the storage controller 16. For example, a copy of all of the files 18 can be periodically captured and sent to an external storage device 14 or copies of only those data blocks within files 18 that have changed since the last backup might be backed up in a new backup operation. The exact policy in operation does not matter; what is important is that the storage controller 16 tracks the backup operations as they occur and is able to track, for each file 18, where that file 18 has been backed up to.

Figure 3:
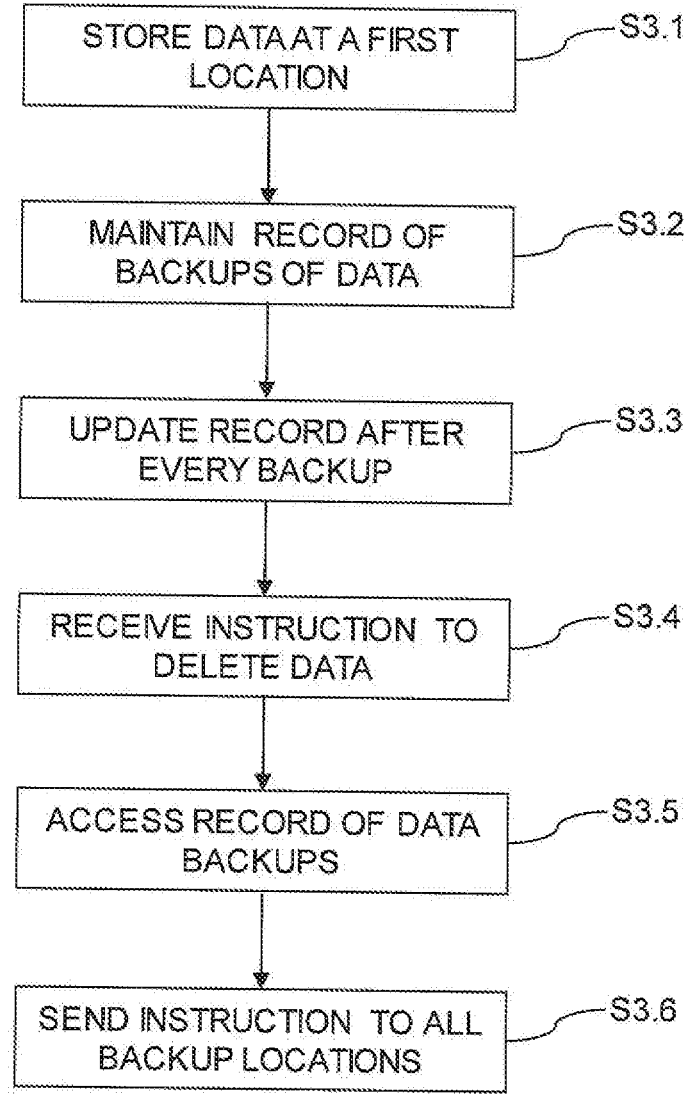
FIG. 3 is a flowchart of a method of storing and deleting data.

FIG. 3 is a flowchart of a method of storing and deleting data in accordance with an embodiment of the present invention. Step S3.1 comprises storing data in a first location and step S3.2 comprises maintaining a record of backups of the stored data. The record defines an entry for each backup comprising details of the data that has been backed up and the location of the data that has been backed up. The record is used to keep track of each backup action that is taken by the storage controller 16. The fundamental parts of the record for each entry are the data that has been backed up (such as a file name or data location) and the location of the data backup.

The next step in the method is step S3.3, which comprises updating the record of backups of the stored data with a new entry every time at least part of the stored data is stored at a new location different from the first location. Every time a backup operation is performed that leads to at least some of the data being backed up to a new location then a new entry is created in the record of backups for that data. This ensures that a continuous record of the backup operations that have occurred with respect to the data in question is created, with each backup operation resulting in a new entry being created in the record.

The next step in the method is step S3.4, which comprises receiving an instruction to delete the stored data, and this is followed by step S3.5, which comprises accessing the maintained record of backups of the stored data, and by step S3.6, which comprises transmitting an instruction for each respective entry in the record of backups, the instruction comprising an instruction to delete the stored data at the respective location for the respective entry. In this way when the data is to be deleted, for whatever reason, then the various backups of the data can also be deleted in a simple and straightforward manner. The record for the data in question contains all the information concerning the relevant backups and this is used to ensure all data that has been backed up is deleted.

The storage controller 16 can also be configured to receive from each respective location a confirmation that the stored data has been deleted and then generate an output confirming that the stored data has been deleted at all backup locations. This means that the user who has instructed the complete deletion of the relevant data will be informed that the necessary deletion actions have taken place and will receive a report to that effect.

The record which contains entries for each backup made up of the data that has been backed up and the location of the data that has been backed up can further comprise a retention policy for the data that has been backed up. The storing of a retention policy in the relevant entry means that the step S3.3 of updating the record of backups of the stored data with a new entry every time at least part of the stored data is stored at a new location different from the first location further comprises including a retention policy in the new entry. The inclusion of the retention policy in the record allows deletion actions to be cross-checked with the appropriate retention policy to ensure that any deletion is in line with policy.

Using a data store method for example, a database or other means of tracking and storing data, the storage controller 16 will track when a file 18 is backed up, where the file 18 is backed up to and the retention policy of that file 18. For instance, a file 18 may be in an immutable fileset or filesystem, and therefore can never be deleted until the retention period has expired. This storage controller 16 will understand and comply with those requirements. For example, if file A is written, then subsequently synced to a remote cluster via AFM (active file management) or async mirroring, the storage controller 16 will understand this connection and track this information in the relevant entry in the record. If the fileset that the file 18 is written to is then snapshotted, the storage controller 16 will track the snapshot that contains this file 18 and any further snapshots that are taken to control this file 18. See Table 1, below:

TABLE 1

| File | Backup Type | Attribute | Retention policy |
|---|---|---|---|
| File A | Snapshot | Snapshot1 | NA |
| File A | Snapshot | Snapshot2 | NA |
| File A | Snapshot | Snapshot3 | NA |

When File B is written, a similar Table 2 will be generated, below:

TABLE 2

| File | Backup Type | Attribute | Retention policy |
|---|---|---|---|
| File B | Snapshot | Snapshot2 | NA |
| File B | Snapshot | Snapshot3 | NA |
| File B | Snapshot | Snapshot4 | NA |

The storage controller 16 can see here that file B is tracked in snapshots 2 to 4, and that some of these snapshots also contain File A. When a user wants to delete file B and all of its backups, the storage controller 16 will know that file B is in snapshots 2 to 4 and will remove only file B, leaving file A in place in the snapshots that contain file A.

This same principle could be extended to any other backup system that would support a storage controller that operates in this way. This operation of the storage controller 16 can also allow for multiple layers of deletion. For example, a user may only want to delete the file from an active filesystem, but maintain all of its backups. In this case, the storage controller 16 operates to allow for the file in question to be deleted and can then sync this delete to an AFM relationship where the file would be removed from the remote storage as well.

In the case that the user wants to delete all local copies, the storage controller 16 would understand that the file is stored in Snapshots, and would walk through an index node tree of the snapshots and only remove the references to the file in the snapshots. Finally, in the case that a user wants to remove any record of a file, the storage controller 16 would understand if the file has been written to a cloud provider or tape backup and would send the necessary command to that backup protocol to delete the file.

Although the above is described with reference to a file, the operation of the storage controller 16 can also be extended to the block level where a portion of a vdisk is written and a host wants to remove that section from the system. The storage controller 16 would understand any mirroring, flash copy, cloud tiering of the block and would send the necessary commands to remove the file. In the case that a block is part of a deduplication engine, the storage controller 16 would alert the deduplication engine that this block is no longer required and if the deduplication engine no longer needs the reference for other deduplications, the deduplication engine would be instructed to remove the block from its dictionary.

Figure 4:
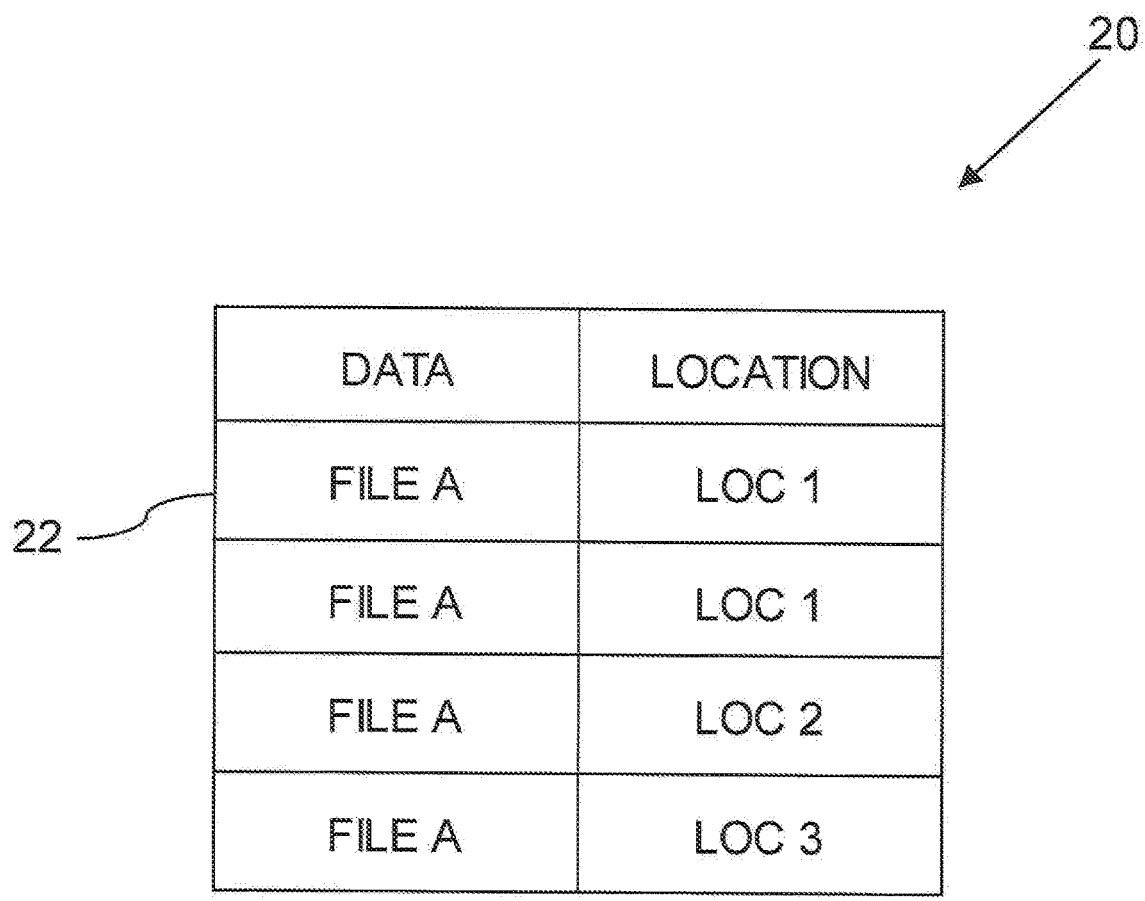
FIG. 4 is a schematic diagram of a record of data backups.

FIG. 4 is a schematic diagram of a record 20 of backups of stored data, the record defining an entry 22 for each backup comprising details of the data that has been backed up and the location of the data that has been backed up. The record 20 of backups of the stored data is updated with a new entry 22 every time at least part of the stored data is stored at a new location different from the first location. For each data entity (whether at the file level or at the block level) a corresponding record 20 is maintained which details the data that has been backed up and the location of the data.

Figure 5:
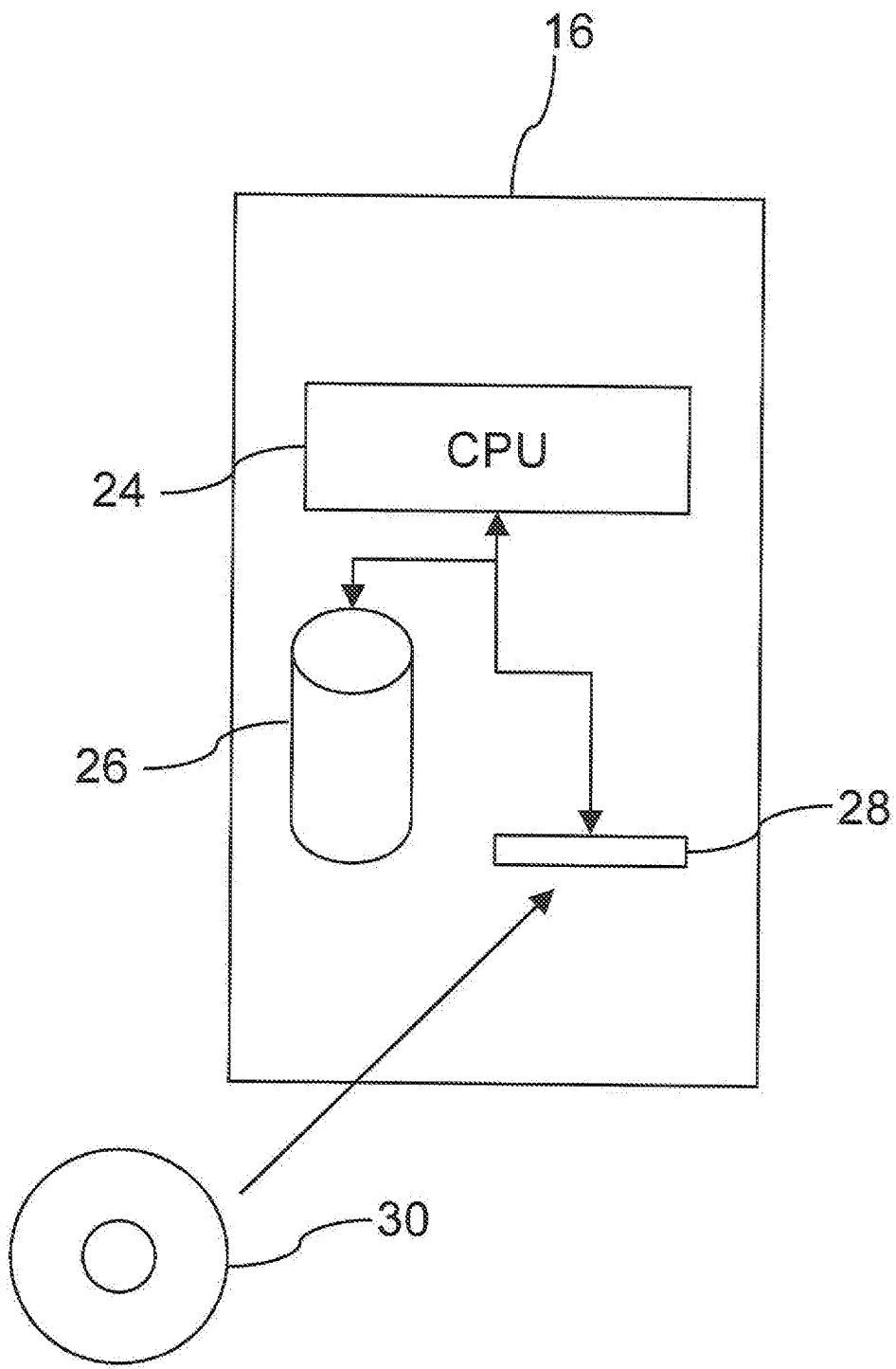
FIG. 5 is a schematic diagram of a storage controller.

FIG. 5 shows a more detailed schematic diagram of one embodiment of a storage controller 16. The storage controller 16 comprises a processor 24, which is controlling the operation of the storage controller 16. The processor 24 of the storage controller 16 is also connected to a local storage device 26 and to a local interface 28. A computer readable storage medium 30 is provided, which is a CD-ROM 30 storing a computer program product that can be used to control the processor 24 to operate the storage controller 16. The processor 24 executes instructions from the computer program product to operate the storage controller 16.

Figure 6:
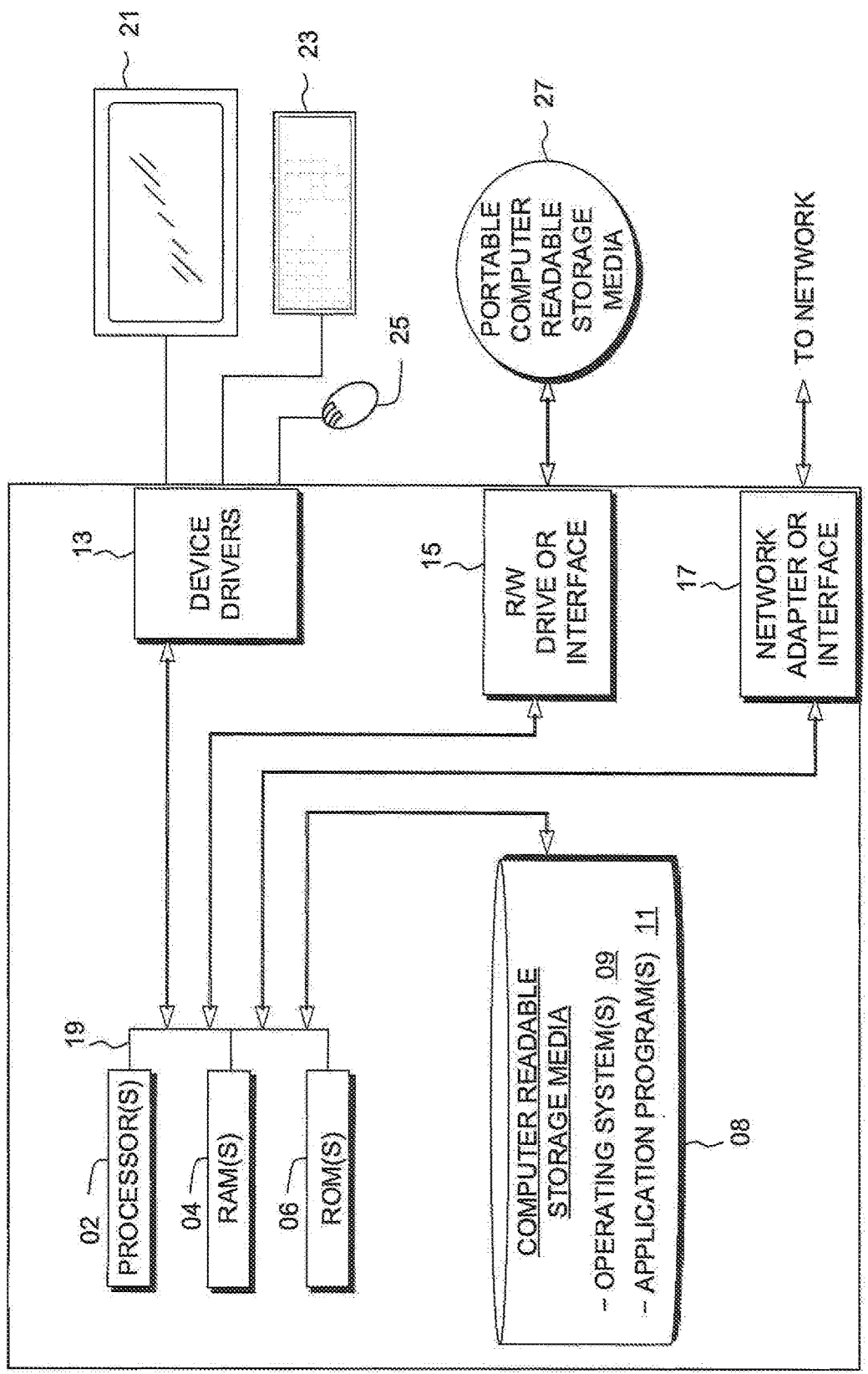
FIG. 6 is a schematic diagram of hardware components.

FIG. 6 depicts a block diagram of devices and components utilized to implement the invention in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Devices used in the present invention may include one or more processors 02, one or more computer-readable RAMs 04, one or more computer-readable ROMs 06, one or more computer readable storage media 08, device drivers 13, read/write drive or interface 15, network adapter or interface 17, all interconnected over a communications fabric 19. Communications fabric 19 may be implemented with any architecture designed for passing data and/or control information between processors (such as microprocessors, communications and network processors, etc.), system memory, peripheral devices, and any other hardware components within a system.

One or more operating systems 09, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used in the present invention may also include a R/W drive or interface 15 to read from and write to one or more portable computer readable storage media 27. Application programs 11 on said devices may be stored on one or more of the portable computer readable storage media 27, read via the respective R/W drive or interface 15 and loaded into the respective computer readable storage media 08.

Devices used in the present invention may also include a network adapter or interface 17, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 17. From the network adapter or interface 17, the programs may be loaded onto computer readable storage media 08. The network may comprise copper wires, optical fibers, wireless transmission, routers, firewalls, switches, gateway computers and/or edge servers.

Devices used in the present invention may also include a display screen 21, a keyboard or keypad 23, and a computer mouse or touchpad 25. Device drivers 13 interface to display screen 21 for imaging, to keyboard or keypad 23, to computer mouse or touchpad 25, and/or to display screen 21 for pressure sensing of alphanumeric character entry and user selections. The device drivers 13, R/W drive or interface 15 and network adapter or interface 17 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
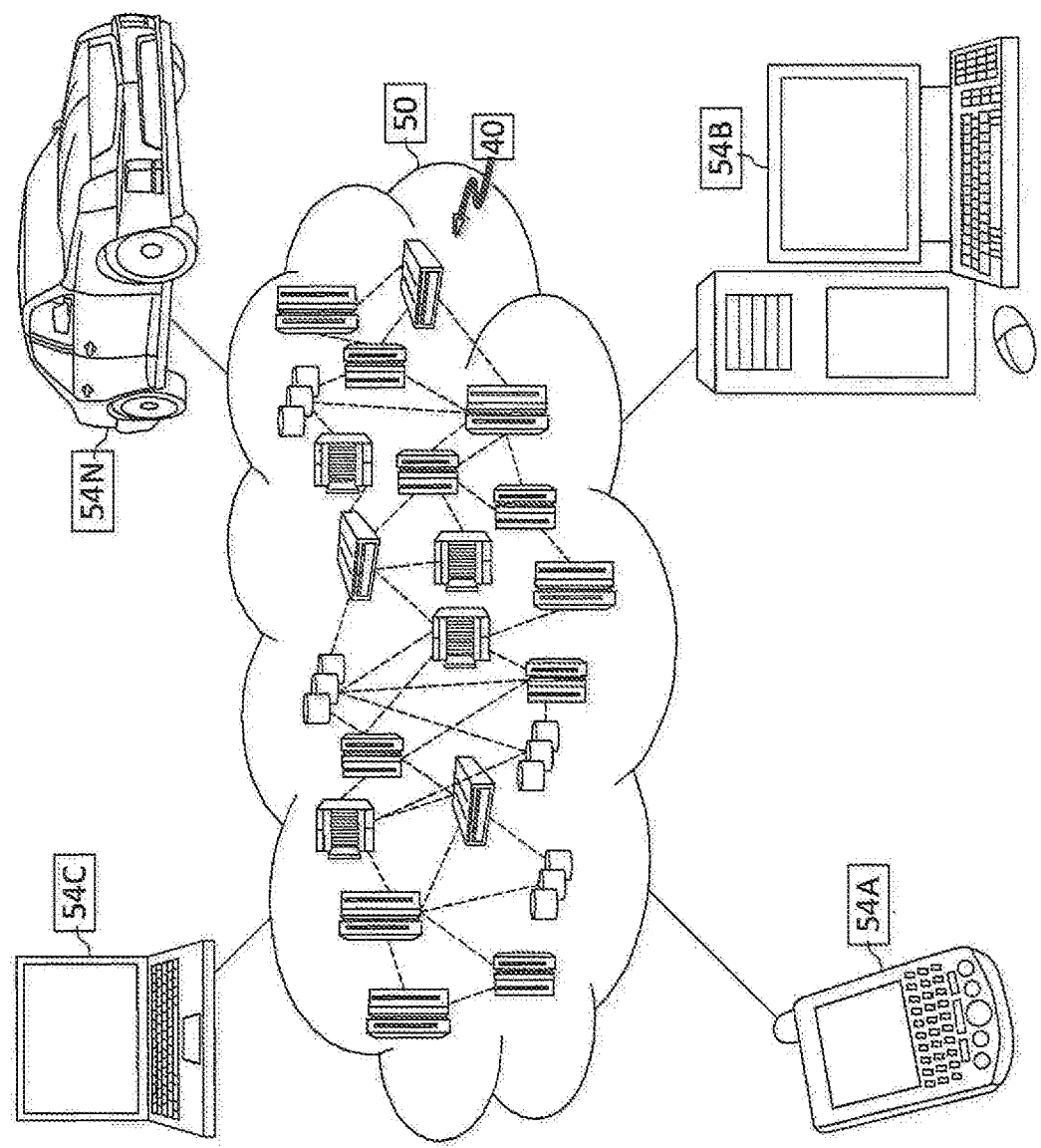
FIG. 7 is a schematic diagram of cloud computing environment.

Referring now to FIG. 7, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 40 and cloud computing environment 50 can communicate with any type of computerized device over any type of network and/or network addressable connection (e.g., using a web browser).

Figure 8:
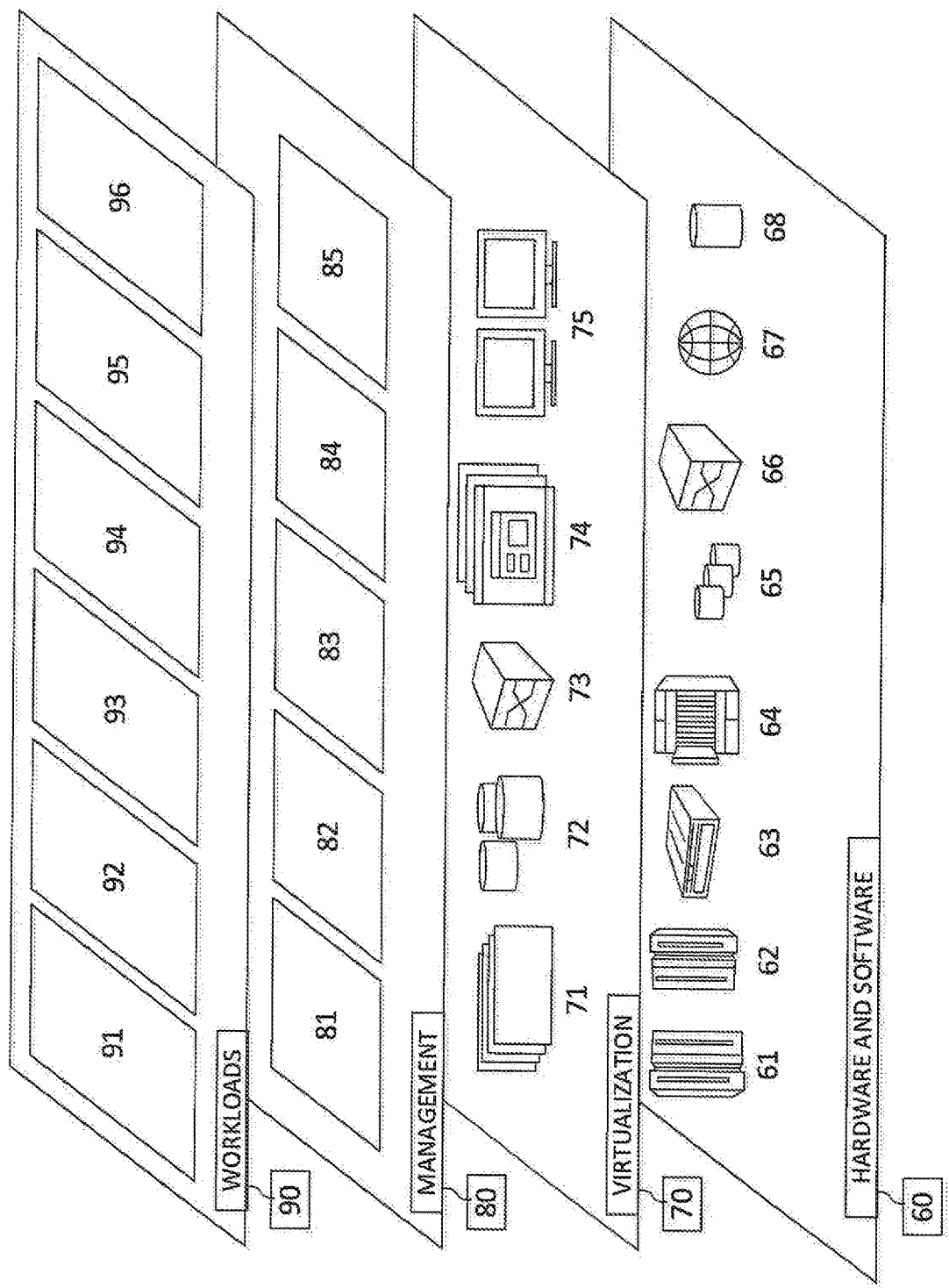
FIG. 8 is a schematic diagram of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for variable deletion of stored data, the method comprising:
    storing data in a first location;
    maintaining a record of backups of the stored data, the record defining an entry for each backup comprising details of a data that has been backed up and a location of the data that has been backed up;
    updating the record of backups of the stored data with a new entry every time at least part of the stored data is stored at a new location different from the first location;
    receiving an instruction to delete the stored data;
    accessing the maintained record of backups of the stored data in order to identify each respective entry of the stored data in the record of backups;
    transmitting an instruction for the each respective entry in the record of backups, the instruction comprising an instruction to delete the stored data at a respective location for the respective entry; and
    in response to completing the instruction to delete the stored data, receiving from each respective location a confirmation that the stored data is deleted in all backup locations, followed by generating an output confirming that the stored data has been deleted at all backup locations.

2. The method according to claim 1, wherein the record defining an entry for each backup comprising the details of data that has been backed up and the location of the data that has been backed up further comprises a retention policy for the data that has been backed up.

3. The method according to claim 2, wherein the step of updating the record of backups of the stored data with a new entry every time at least part of the stored data is stored at a new location different from the first location further comprises including a retention policy in the new entry.

4. A storage controller comprising a processor arranged to:
    store data in a first location;
    maintain a record of backups of the stored data, the record defining an entry for each backup comprising details of a data that has been backed up and a location of the data that has been backed up;
    update the record of backups of the stored data with a new entry every time at least part of the stored data is stored at a new location different from the first location;
    receive an instruction to delete the stored data;
    access the maintained record of backups of the stored data in order to identify each respective entry of the stored data in the record of backups;
    transmit an instruction for the each respective entry in the record of backups, the instruction comprising an instruction to delete the stored data at a respective location for the respective entry; and
    in response to completing the instruction to delete the stored data, receiving from each respective location a confirmation that the stored data is deleted in all backup locations, followed by generating an output confirming that the stored data has been deleted at all backup locations.

5. The storage controller according to claim 4, wherein the record defining an entry for each backup comprising details of the data that has been backed up and the location of the data that has been backed up further comprises a retention policy for the data that has been backed up.

6. The storage controller according to claim 5, wherein the processor is arranged, when updating the record of backups of the stored data with a new entry every time at least part of the stored data is stored at a new location different from the first location, to include a retention policy in the new entry.

7. A computer program product for controlling a data processing system comprising a processor, the computer program product comprising a computer readable storage medium having program instructions embodied therewith, the program instructions executable by the processor to cause the processor to:
    store data in a first location;
    maintain a record of backups of the stored data, the record defining an entry for each backup comprising the data that has been backed up and the location of the data that has been backed up;
    update the record of backups of the stored data with a new entry every time at least part of the stored data is stored at a new location different from the first location;
    receive an instruction to delete the stored data;
    access the maintained record of backups of the stored data in order to identify each respective entry of the stored data in the record of backups;
    transmit an instruction for the each respective entry in the record of backups, the instruction comprising an instruction to delete the stored data at a respective location for the respective entry; and
    in response to completing the instruction to delete the stored data, receiving from each respective location a confirmation that the stored data is deleted in all backup locations, followed by generating an output confirming that the stored data has been deleted at all backup locations.

8. The computer program product according to claim 7, wherein the record defining an entry for each backup comprising the data that has been backed up and the location of the data that has been backed up further comprises a retention policy for the data that has been backed up.

9. The computer program product according to claim 8, wherein the instructions for updating the record of backups of the stored data with a new entry every time at least part of the stored data is stored at a new location different from the first location further comprises instructions for including a retention policy in the new entry.

* * * * *